Figure 1:
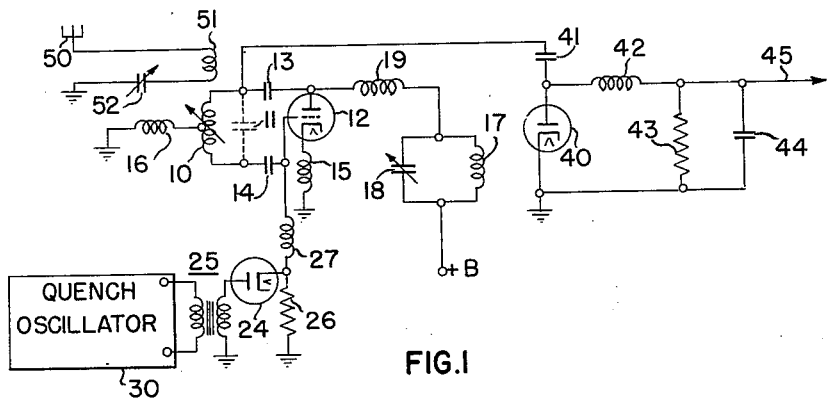

Sept. 13, 1949.        B. D. LOUGHLIN        2,481,852
SUPERREGENERATIVE RECEIVER Filed Nov. 30, 1944                          2 Sheets-Sheet 1

INVENTOR
BERNARD D. LOUGHLIN
BY
ATTORNEY

Sept. 13, 1949.  B. D. LOUGHLIN  2,481,852
SUPERREGENERATIVE RECEIVER
Filed Nov. 30, 1944  2 Sheets-Sheet 2
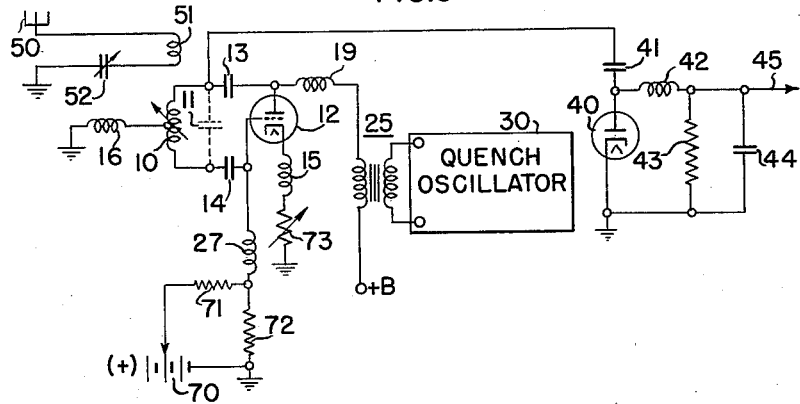
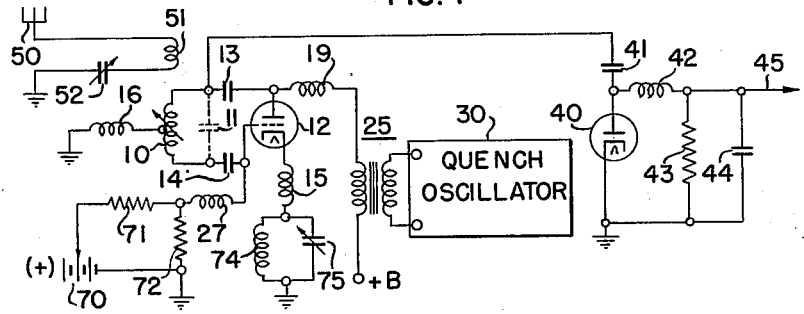
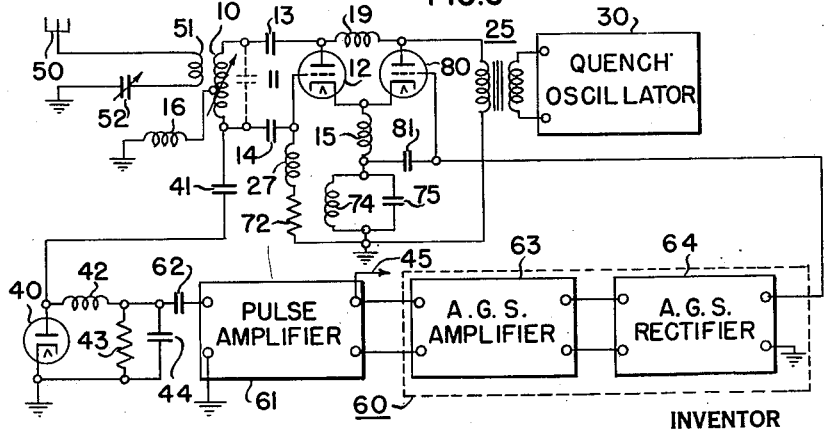
INVENTOR
BERNARD D. LOUGHLIN
BY *Harry B. Page*
ATTORNEY Patented Sept. 13, 1949

2,481,852

UNITED STATES PATENT OFFICE 2,481,852

SUPERREGENERATIVE RECEIVER

Bernard D. Loughlin, Bayside, N. Y., assignor, by mesne assignments, to Hazeltine Research, Inc., Chicago, Ill., a corporation of Illinois Application November 30, 1944, Serial No. 565,947

20 Claims. (Cl. 250—20)

This invention relates, in general, to superregenerative receivers and is particularly directed to such receivers wherein the superregenerative effect is controlled by a periodic quench signal which may have an unusually high frequency.

Essentially, receivers of the type under consideration comprise a regenerative oscillatory circuit which is controlled by a periodic quench signal to have alternately positive and negative values of conductance, the quenching frequency being low with reference to the operating frequency of the receiver. In order to achieve stable operating conditions, the control of the regenerative circuit by the quench signal is such that the circuit conductance, integrated over a period of time which is long with reference to the period of the quench signal, has a positive value. While such a receiver may have any of several distinct modes of operation, for convenience of explanation the instant discussion is to be limited to a consideration of the so-called "linear mode of operation."

For this mode, transient oscillations are initiated in the regenerative circuit at the start of each interval of negative conductance, the oscillations increasing in amplitude in an exponential manner throughout the duration of the negative-conductance period. In the positive-conductance interval, following such a period of negative conductance, the circuit damping suppresses the generated oscillations. Therefore, in operation, the receiver produces transient oscillations which occur at the quench frequency. The maximum amplitude level attained by the oscillations generated in any quench cycle is determined, assuming a condition of fixed receiver gain, by the amplitude of the signal which initiated the oscillations in the particular quench cycle. When no signal is being received, these oscillations are initiated by disturbances inherently present in the receiver circuit, such as the circuit noise signals, shot effect, and the like. In general, such disturbances have a relatively low intensity and the oscillations they provoke have a correspondingly low maximum amplitude. On the other hand, received signals usually have a considerably greater amplitude than the receiver noise signals and the oscillations resulting in any quench cycle which occurs within the duration of a received signal attain a correspondingly higher maximum amplitude. Thus, the superregenerative receiver may be likened to an exceedingly high-gain amplifier in that it greatly amplifies signals applied to or inherently present in its regenerative circuit. A usable output signal is customarily obtained therefrom by detecting the transient oscillations.

Where the quench signal has a relatively low frequency, the intervals of positive conductance are sufficiently long to permit the circuit damping to quench the transient oscillations to an insignificantly low value or zero, as required for stable operation. However, at high quenching rates, the transient oscillations generated in one quench cycle may have an appreciable value at the start of the next succeeding interval of negative conductance so that their effect is carried over into the following period of regeneration. This carrying over of transient oscillations from one period of regeneration to another may produce intolerable results, certain of which may be advantageously mentioned.

Let it be assumed that a radio-frequency signal is being applied to the receiver and that the amplitude of the oscillations carried over from one quench cycle to the next is only about one-tenth that of the received signal. If the carry-over signal has the same phase as the received radio-frequency signal, they aid one another and the amplitude of the receiver output signal is undesirably increased approximately ten per cent. Conversely, where the carry-over and radio-frequency signals are in phase-opposition, the amplitude of the receiver output signal is decreased an equivalent amount. In other words, the carry-over causes distortion in the receiver response. In fact, it may be demonstrated that with the assumed per cent carry-over the frequency-response characteristic of the receiver, instead of being smooth, has undulations or ripples having a frequency corresponding to the quench frequency and a peak-to-peak amplitude of approximately twenty per cent. At high quench frequencies, the carry-over and ensuing distortion become even more pronounced.

Also, the carry-over phenomena may have a cumulative effect, becoming exaggerated in succeeding quench cycles. Where this condition is encountered, the regenerative circuit is ultimately driven into a condition of sustained oscillations and all superregenerative reception is lost.

Arrangements have been proposed for obviating the above-discussed operating limitations of conventional superregenerative receivers. One arrangement utilizes a vacuum-tube device, such as a diode or triode tube, coupled across the tank circuit of the regenerator and controlled by the quench voltage to be conductive during operating intervals when the regenerative circuit has a positive value of conductance. The added tube increases the circuit damping to suppress the transient oscillations to an inappreciable value as desired. While such arrangements may reduce the objectionable carry-over effect, they may be undesirable insofar as they reduce the receiver signal-to-noise ratio. In this connection, it is to be noted that the circuit damping is accomplished by shunting the regenerative circuit with an impedance, the electron-current path of the added tube. Since any such impedance inherently has noise signals, this adds a noise-signal component to the regenerative circuit which is amplified like any other signal present in the regenerative circuit at the start of the negative-conductance interval. Furthermore, the extra damping tube coupled across the regenerator tank circuit may be undesirable per se. Also, it may unduly complicate the receiver by necessitating the addition of phase-correcting circuits in order to obtain correct phase relations between the quench signal as applied to the regenerative circuit and to the added tube.

In another prior arrangement, the regenerative circuit comprises a vacuum tube having anode, cathode and control electrodes coupled to a resonant circuit to provide a regenerative device. One resonant circuit tuned to a desired quench frequency is included in the anode-cathode circuit of the tube and another, tuned to the same frequency, is included in its control electrode-cathode circuit. In this arrangement, the regenerative circuit generates its own quench signal and the application of this signal to the control electrode of the regenerator tube is such as to produce control electrode-cathode current flow for supplying extra damping to reduce carry-over effects. This arrangement adversely affects the signal-to-noise ratio of the receiver for the reasons stated in the preceding paragraph. Furthermore, the circuit is very critical and extreme care must be exercised to realize any superregeneration.

It is, therefore, an object of the invention to provide an improved superregenerative receiver which avoids one or more of the above-mentioned limitations of prior-art arrangements.

It is another object of the invention to provide a superregenerative receiver having an improved arrangement for assuring proper operation at high quench frequencies.

It is a further object of the invention to provide a superregenerative receiver including an arrangement for assuring proper operation at high quench frequencies and having an improved signal-to-noise ratio.

A superregenerative receiver, in accordance with a feature of the present invention, comprises resonant-circuit means determining the operating frequency of the receiver and vacuum-tube means coupled to the resonant-circuit means to constitute therewith a regenerative oscillatory circuit. The receiver has means for controlling the conductance of the regenerative oscillatory circuit to have positive and negative values during alternate operating intervals and a conductance-time characteristic effective to provide superregenerative amplification of wave signals applied to the regenerative circuit. Also, there is included in the receiver additional circuit means coupled to the regenerative oscillatory circuit and having parameters so selected as to apply to the regenerative oscillatory circuit effectively a periodic signal to provide damping of the regenerative oscillatory circuit but only during a selected fractional portion of the aforesaid interval of positive conductance to increase the magnitude of the positive conductance during this fractional portion of its positive-conductance interval. The fractional portion is selected to terminate substantially before the end of the interval of positive conductance.

In accordance with another feature of the invention, the additional means for damping the regenerative oscillatory circuit of the receiver is effective only during operating intervals in which the regenerative circuit has positive conductance. In this case, the additional damping may, if desired, be obtained during the entire positive-conductance interval of the regenerative circuit.

For a better understanding of the present invention, together with other and further objects thereof, reference is had to the following description taken in connection with the accompanying drawings, and its scope will be pointed out in the appended claims.

Figure 2:
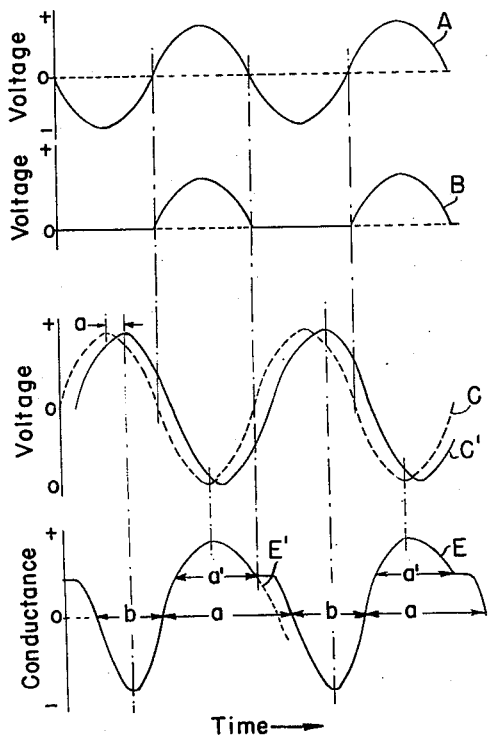

In the drawings, Fig. 1 is a schematic representation of a superregenerative receiver embodying the present invention in one form; Fig. 2 comprises a series of graphs utilized in explaining the operation of the Fig. 1 arrangement; while Figs. 3, 4 and 5, respectively, represent individual superregenerative receivers including the invention in modified form.

Referring now more particularly to Fig. 1, the superregenerative receiver there represented comprises resonant-circuit means for determining the operating frequency of the receiver and vacuum-tube means coupled to the resonant-circuit means to constitute therewith a regenerative oscillatory circuit. As illustrated, the frequency-determining circuit includes a variable inductor 10 which is tuned by a condenser 11, represented in broken-line construction since it may be comprised in whole or in part of the distributed capacitance of inductor 10 and other inherent capacitances associated therewith including the interelectrode capacitance of the vacuum-tube means. The vacuum-tube means consists of a triode 12 having anode-cathode and control electrode-cathode circuits. The anode and control electrodes of tube 12 are coupled to the frequency-determining circuit 10, 11 through condensers 13 and 14, respectively. The cathode thereof is grounded through a radio-frequency choke 15, while a tap of inductor 10 is similarly grounded through a choke 16 to complete the regenerative oscillatory circuit.

The receiver has means for effectively applying a periodic quench voltage to the anode-cathode circuit of tube 12 for controlling the conductance of the regenerative oscillatory circuit to have positive and negative values during alternate operating intervals, as required to provide superregeneration. This means comprises a second adjustably tuned resonant-circuit means included in the anode-cathode circuit of tube 12 and responsive to an applied periodic quench voltage for controlling the conductance of the regenerative circuit. The second resonant-circuit means includes an inductor 17 adjustably tuned by a variable condenser 18, this circuit being coupled to the anode and cathode electrodes of tube 12 through a radio-frequency choke 19 and the space-current source for the tube, indicated +B. The resonant frequency of the circuit 17, 18 corresponds substantially to the quenching frequency of the receiver, as will be described more particularly hereinafter.

Additional means are included in the receiver for damping its regenerative oscillatory circuit.

but preferably only during a selected fractional portion of its operating intervals of positive conductance to increase the magnitude of the positive conductance during the selected fractional portion of such intervals. This means is included in the control electrode-cathode circuit of tube 12 and is also utilized for applying a periodic quench voltage from an external source to the regenerative circuit, as well as for providing the additional damping. More particularly, a half-wave rectifying system is coupled intermediate the control electrode-cathode circuit of tube 12 and an external quench-voltage source 30. The rectifier system includes a diode rectifier 24 having a load circuit provided by the secondary winding of a transformer 25 and a resistor 26. Resistor 26 is coupled to the control electrode of tube 12 through a radio-frequency choke 27. The primary winding of the transformer 25 is coupled to the output circuit of quench oscillator 30. While the quench voltage may have any suitable wave form, unit 30 will be considered to comprise a conventional sine-wave oscillator, for generating a quench voltage having a frequency which is low with reference to the operating frequency of the regenerative oscillatory circuit, but high with reference to the highest modulation components of a received signal to be translated.

A detector system, including a diode 40, is coupled to the regenerative circuit through a condenser 41. The load circuit of diode 40 comprises a radio-frequency choke 42 and a resistor 43 bypassed by a condenser 44. The output signal of the receiver, obtained across the load circuit of detector 40, may be applied to any suitable utilizing circuit (not shown), as indicated by the arrow 45.

An antenna-ground system 50, including an inductor 51 and a tuning condenser 52, applies received signals to the regenerative circuit. To this end, inductor 51 is arranged inductively to couple the antenna system to inductor 10 of the regenerative circuit. The coupling between inductors 51 and 10 contributes a loading or damping effect to the regenerative circuit. This coupling is preferably adjusted to provide maximum energy to the receiver consistent with the desired receiver gain and, in conjunction with the self-damping of regenerative circuit, determines the normal circuit damping during normal operating intervals of positive conductance. Before considering the operation of the described receiver, reference is made to Fig. 2, wherein curves A and B, respectively, represent the signal output of quench oscillator 30 and the rectified quench voltage appearing across resistor 26. The rectified quench voltage is applied with positive polarity to the control electrode of tube 12, producing control electrode-cathode current flow therein at the quench frequency. Each time the control electrode of tube 12 is driven in a positive direction, its anode-cathode current tends to increase to an abnormally large value. However, this phenomenon occurs at the quench frequency at which frequency resonant circuit 17, 18 presents a maximum value of impedance, thereby to reduce the plate current of tube 12 during intervals in which control electrode-cathode current flows. At the end of each such interval, the stored energy of circuit 17, 18 augments the excitation potential applied to the anode-cathode circuit of tube 12 from source +B. Therefore, assuming the operating frequency of circuit 17, 18 to correspond with the quench frequency, the anode-cathode excitation potential of tube 12 varies in accordance with broken-line curve C of Fig. 2, varying sinusoidally between the values of substantially zero and twice the value of source +B. In the preferred embodiment of the invention, condenser 18 is adjusted so to relate the operating frequency of circuit 17, 18 to the quench frequency as to delay the anode-cathode voltage of tube 12, as represented by full-line curve C', by an amount indicated a. The advantage thus obtained will be described presently.

The conductance variation of the regenerative oscillatory circuit in response to the signal of curve B applied to its control electrode and that of curve C' to its anode is represented by curve E of Fig. 2. It will be seen that the circuit has positive and negative values of conductance during alternate operating intervals, in accordance with characteristic superregenerative operation. The intervals of positive conductance are indicated by dimension lines $a, a$, while those of negative conductance are indicated by dimension lines $b, b$. During a selected fractional portion of each positive-conductance interval, indicated by dimension lines $a', a'$, the rectified quench voltage produces control electrode-cathode current in tube 12 which affords additional damping and increases the magnitude of the positive conductance during these fractional portions of each positive-conductance interval. It will be apparent from curve E that this increased value of positive conductance is obtained during a major portion of the normal positive-conductance interval and also that the adjustment of tuned circuit 17, 18 is such that the selected portions start approximately at the beginning and terminate substantially before the end of each such normal interval of positive conductance.

The significance of terminating the interval $a'$ of increased positive conductance substantially before the end of interval $a$ of normal positive conductance may be appreciated from a consideration of the receiver signal-to-noise ratio. It is well known that a superregenerative receiver has maximum sensitivity or gain to signals present at the instant when its conductance changes from positive to negative and, therefore, any signal present in the circuit at this instant receives maximum amplification. The expedient of producing control electrode-cathode current in the regenerator tube for the purpose of providing additional damping is somewhat like shunting the regenerative circuit with a damping resistor. Any such added damping resistor, as already indicated, contributes to the noise signals of the circuit to deteriorate its signal-to-noise ratio. By removing the additional damping substantially before the end of the normal positive-conductance interval, in the described manner, the added noise component of the circuit attributable to the extra damping is removed and, therefore, the noise signal of the circuit is reduced to a minimum value prior to the interval of negative conductance or high amplification. Consequently, the signal-to-noise ratio of the receiver is not adversely affected by the additional damping.

The operation of the receiver in translating received wave signals will be understood from the preliminary discussion of this specification. Briefly, during intervals of negative conductance, transient oscillations are generated in the regenerative circuit and reach an amplitude determined by that of the received signal initiating the transient oscillations. These oscillations are detected in detector 40, deriving the modulation components of the received signal for application to a utilizing device. This operation is the same as that of any conventional superregenerative receiver, differing only in that the transient oscillations are more rapidly damped during the intervals of positive conductance, since during such intervals additional damping is provided for the regenerative circuit.

While it is preferred to adjust condenser 18 to obtain the phase displacement α mentioned above, it will be understood that the receiver may also be utilized with resonant circuit 17, 18 adjusted to provide an anode potential for tube 12, as indicated by broken-line curve C. Where such an adjustment is made, the only significant modification of the conductance characteristic is represented by the partial broken-line curve E'. For this condition, the extra damping is no longer removed from the circuit substantially before the end of the normal positive-conductance period. Such a mode of operation is feasible for installations where a high signal-to-noise ratio is not of prime concern.

The superregenerative receivers of Figs. 3, 4 and 5, including modifications of the present invention, are generally similar to that of Fig. 1 and like components in each are designated by corresponding reference numerals. The discussions of these several modifications will be limited largely to the circuit modifications relied upon for additional damping of the regenerative circuit. It will be noted at the outset that in each of these modifications the quench voltage supplied by oscillator 30 is applied through transformer 25 directly to the anode-cathode circuit of the regenerator tube 12.

In the arrangement of Fig. 3 means are provided for applying to the control electrode-cathode circuit of tube 12 a potential having such polarity and magnitude as to produce control electrode-cathode current in the tube for providing additional damping for the regenerative oscillatory circuit. This means, as illustrated, comprises a source of unidirectional potential 70 to which is coupled a resistive network of elements 71 and 72. Resistor 72 is included in the control electrode-cathode circuit of tube 12. Also, a cathode impedance, shown as a variable resistor 73, is included in the control electrode-cathode circuit of tube 12 to respond to the applied quench voltage for so controlling the biasing circuit that the additional damping is provided only during normal intervals of positive conductance. With this circuit arrangement, when anode-cathode current is established in tube 12 during positive portions of the applied quench voltage, a voltage drop is produced across resistor 73 which is in phase opposition with that established across resistor 72. The resulting potential on the control electrode of tube 12 is such as to permit regeneration. On the other hand, during intervals of anode-current cutoff, source 70 produces control electrode-cathode current in tube 12 for providing additional damping of the regenerative circuit. Through appropriate selection of source 70 and resistors 71, 72 and 73, a step or flat portion may be obtained in the conductance characteristics of the regenerative circuit, as illustrated by curve E of Fig. 2. However, the positive portion of the conductance-time characteristics will be symmetrical about an ordinate axis and will include a step or flat portion near the start as well as near the end of the positive-conductance interval. Alternatively, the selection may be such as to produce a modified conductance characteristics of the type represented by curve E'.

The modification of Fig. 4 is identical with that of Fig. 3 except for the cathode impedance. In the instant arrangement, this impedance is provided by a second resonant circuit including an inductor 74 tuned by an adjustable condenser 75 substantially to the quench frequency. In operation of the Fig. 4 arrangement, energy is stored in the resonant circuit 74, 75 during the negative-conductance interval in which anode-cathode current flows in tube 12. During the positive-conductance interval, when tube 12 operates at anode-current cutoff, source 70 is again able to produce control electrode-cathode current for the purpose of additionally damping the regenerative circuit. This added damping is augmented by the energy-storing properties of circuit 74, 75 which drives the cathode of tube 12 in a negative direction during intervals of anode-current cutoff to increase its control electrode-cathode current flow. The step or flat portion in the conductance characteristic of this modification may be obtained by detuning circuit 74, 75 to a frequency lower than the quench frequency.

The receiver of Fig. 5 differs from that of Fig. 4 principally in that it includes a control arrangement for controlling an operating characteristic of the receiver, such as the sensitivity characteristic. The control arrangement, or automatic-gain-stabilization system, is designated by reference numeral 60 and is coupled to the load circuit of detector 40 through a pulse amplifier 61 and condenser 62. Unit 60 includes an A. G. S. amplifier 63 of one or more stages to which is coupled an A. G. S. rectifier 64. The output voltage obtained from rectifier 64 varies in magnitude in accordance with variations of the sensitivity characteristic of the receiver and is utilized to control the receiver gain. To this end, the control voltage is applied to a variable impedance which is connected in shunt relation to the anode and cathode electrodes of tube 12. This impedance is a second vacuum-tube means 80 having anode and cathode electrodes which are coupled, respectively, to the anode and cathode electrodes of tube 12 and having a control electrode which is maintained substantially at the potential of its cathode for signals of the quench frequency by virtue of a condenser 81.

The operation of the Fig. 5 arrangement, neglecting the function of control unit 60, is substantially the same as that of Fig. 4. In stabilizing the receiver sensitivity, the output signal of detector system 40 is amplified in amplifier 61 and supplied to A. G. S. amplifier 63. The amplitude of this signal varies directly in accordance with the sensitivity of the receiver and a selected portion thereof is further amplified in amplifier 63 and rectified in rectifier 64 to derive a control voltage which likewise has an amplitude varying in accordance with the receiver gain. In conventional control arrangements, the quench-frequency component of the output signal of the receiver detector system is utilized to derive this gain-control voltage. Selectors for this purpose may be considered to be included in amplifier 63. The resulting control voltage, as applied to tube 80, determines the impedance thereof and thereby the extent to which the quench voltage is shunted from regenerator tube 12. In other words, the arrangement is analogous to a voltage-divider system wherein the amplitude of the quench voltage applied to tube 12 is directly determined by the conductivity of tube 80. As is well understood, the sensitivity of a superregenerative receiver varies directly with the amplitude of the applied quench voltage and, therefore, unit 60 through its control of the conductivity of tube 80 is able to stabilize the receiver sensitivity.

In the described Fig. 5 arrangement, the cathode circuits of tubes 12 and 80 have resonant circuit 74, 75 in common. For this reason, the entire quench voltage is translated by this resonant circuit, irrespective of the shunting effect of tube 80, so that the additional damping produced by control electrode-cathode current flow may be achieved by virtue of the energy-storage effects of elements 74, 75 in a manner similar to that of the Fig. 4 embodiment. Condenser 81, by permitting the control electrode of tube 80 to follow its cathode for signals at the quench frequency, assures that control electrode-cathode current flow occurs only in tube 12. This is desirable since corresponding current flow in tube 80 would have little or no damping effect on the regenerative circuit.

Each of the several described embodiments of the invention features the provision of extra damping for the regenerative circuit to minimize carry-over effects, especially where high quench frequencies are employed. Also, the added damping is obtained by producing control electrode-cathode current flow in the regenerator tube of a receiver circuit which is not critical in adjustment. This avoids the necessity of complicating the receiver by the inclusion of an extra damping tube coupled to the regenerator tank circuit. Furthermore, proper phasing of the extra damping effect with reference to the quench voltage is automatically established. In the preferred embodiments of the invention, an improved signal-to-noise ratio results in addition to the above-recited advantages. Briefly, the improvement in the signal-to-noise ratio is achieved by removing the extra damping from the regenerative circuit substantially before the end of its normal positive-conductance interval.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A superregenerative receiver comprising, resonant-circuit means determining the operating frequency of said receiver, vacuum-tube means coupled to said resonant-circuit means to constitute therewith a regenerative oscillatory circuit, means for controlling the conductance of said regenerative oscillatory circuit to have positive and negative values during alternate operating intervals and a conductance-time characteristic effective to provide superregenerative amplification of wave signals applied to said regenerative oscillatory circuit, and additional circuit means coupled to said regenerative oscillatory circuit and having parameters so selected as to apply to said regenerative oscillatory circuit effectively a periodic signal to provide damping of said regenerative oscillatory circuit but only during a selected fractional portion of said interval of positive conductance to increase the magnitude of said positive conductance during said fractional portion of said interval, said fractional portion being selected to terminate substantially before the end of said interval of positive conductance.

2. A superregenerative receiver comprising, resonant-circuit means determining the operating frequency of said receiver, vacuum-tube means coupled to said resonant-circuit means to constitute therewith a regenerative oscillatory circuit, means for controlling the conductance of said regenerative oscillatory circuit to have positive and negative values during alternate operating intervals and a conductance-time characteristic effective to provide superregenerative amplification of wave signals applied to said regenerative oscillatory circuit, and additional circuit means coupled to said regenerative oscillatory circuit and having parameters so selected as to apply to said regenerative oscillatory circuit effectively a periodic signal to provide damping of said regenerative oscillatory circuit but only during a selected fractional portion of said interval of positive conductance to increase the magnitude of said positive conductance during said fractional portion of said interval, said fractional portion being selected to start approximately at the beginning and to terminate substantially before the end of said interval of positive conductance.

3. A superregenerative receiver comprising, resonant-circuit means determining the operating frequency of said receiver, vacuum-tube means coupled to said resonant-circuit means to constitute therewith a regenerative oscillatory circuit, means for controlling the conductance of said regenerative oscillatory circuit to have positive and negative values during alternate operating intervals and a conductance-time characteristic effective to provide superregenerative amplification of wave signals applied to said regenerative oscillatory circuit, and additional circuit means coupled to said regenerative oscillatory circuit and having parameters so selected as to apply to said regenerative oscillatory circuit effectively a periodic signal to provide damping of said regenerative oscillatory circuit but only during a selected major portion of said interval of positive conductance to increase the magnitude of said positive conductance during said portion of said interval, said portion being selected to terminate substantially before the end of said interval of positive conductance.

4. A superregenerative receiver comprising, resonant-circuit means determining the operating frequency of said receiver, vacuum-tube means having an anode-cathode circuit and coupled to said resonant-circuit means to constitute therewith a regenerative oscillatory circuit, means for effectively applying a periodic quench voltage to said anode-cathode circuit for controlling the conductance of said regenerative oscillatory circuit to have positive and negative values during alternate operating intervals and a conductance-time characteristic effective to provide superregenerative amplification of wave signals applied to said regenerative oscillatory circuit, and additional circuit means coupled to said regenerative oscillatory circuit and having parameters so selected as to apply to said regenerative oscillatory circuit effectively a periodic signal to provide damping of said regenerative oscillatory circuit but only during a selected fractional portion of said interval of positive conductance to increase the magnitude of said positive conductance during said fractional portion of said interval, said fractional portion being selected to terminate substantially before the end of said interval of positive conductance.

5. A superregenerative receiver comprising, resonant-circuit means determining the operating frequency of said receiver, vacuum-tube means having a control electrode-cathode circuit and coupled to said resonant-circuit means to constitute therewith a regenerative oscillatory circuit, means for controlling the conductance of said regenerative oscillatory circuit to have positive and negative values during alternate operating intervals and a conductance-time characteristic effective to provide superregenerative amplification of wave signals applied to said regenerative oscillatory circuit, and additional circuit means so arranged in said control electrode-cathode circuit and having parameters so selected as to apply to said control electrode-cathode circuit during only a selected fractional portion of said interval of positive conductance a signal of such value as to produce control electrode-cathode current in said vacuum-tube means for damping said regenerative oscillatory circuit but only during said selected fractional portion of said interval of positive conductance to increase the magnitude of said positive conductance during said fractional portion of said interval, said fractional portion being selected to terminate substantially before the end of said interval of positive conductance.

6. A superregenerative receiver comprising, resonant-circuit means determining the operating frequency of said receiver, vacuum-tube means having a control electrode-cathode circuit and coupled to said resonant-circuit means to constitute therewith a regenerative oscillatory circuit, means for applying a periodic quench voltage to said vacuum-tube means for controlling the conductance of said regenerative oscillatory circuit to have positive and negative values during alternate operating intervals and a conductance-time characteristic effective to provide superregenerative amplification of wave signals applied to said regenerative oscillatory circuit, and additional circuit means controlled by said quench voltage and so arranged in said control electrode-cathode circuit and having parameters so selected as to apply to said control electrode-cathode circuit during only a selected fractional portion of said interval of positive conductance a signal of such value as to produce control electrode-cathode current in said vacuum-tube means for damping said regenerative oscillatory circuit but only during said selected fractional portion of said interval of positive conductance to increase the magnitude of said positive conductance during said fractional portion of said interval, said fractional portion being selected to terminate substantially before the end of said interval of positive conductance.

7. A superregenerative receiver comprising, resonant-circuit means determining the operating frequency of said receiver, vacuum-tube means coupled to said resonant-circuit means to constitute therewith a regenerative oscillatory circuit, means for coupling an external source of periodic quench voltage to said vacuum-tube means for controlling the conductance of said regenerative oscillatory circuit to have positive and negative values during alternate operating intervals and a conductance-time characteristic effective to provide superregenerative amplification of wave signals applied to said regenerative oscillatory circuit, and additional circuit means coupled to said regenerative oscillatory circuit and having parameters so selected as to apply to said regenerative oscillatory circuit effectively a periodic signal to provide damping of said regenerative oscillatory circuit but only during a selected fractional portion of said interval of positive conductance to increase the magnitude of said positive conductance during said fractional portion of said interval, said fractional portion being selected to terminate substantially before the end of said interval of positive conductance.

8. A superregenerative receiver comprising, resonant-circuit means determining the operating frequency of said receiver, vacuum-tube means having anode-cathode and control electrode-cathode circuits coupled to said resonant-circuit means to constitute therewith a regenerative oscillatory circuit, a second resonant-circuit means included in said anode-cathode circuit and responsive to an applied periodic quench voltage for controlling the conductance of said regenerative oscillatory circuit to have positive and negative values during alternate operating intervals and a conductance-time characteristic effective to provide superregenerative amplification of wave signals applied to said regenerative oscillatory circuit, and means included in said control electrode-cathode circuit for applying a periodic quench voltage to said regenerative oscillatory circuit and for providing additional damping for said regenerative oscillatory circuit but only during a selected fractional portion of said interval of positive conductance to increase the magnitude of said positive conductance during said fractional portion of said interval, the operating frequency of said second resonant-circuit means being so related to the frequency of said quench voltage that said selected fractional portion terminates substantially before the end of said interval of positive conductance.

9. A superregenerative receiver comprising, resonant-circuit means determining the operating frequency of said receiver, vacuum-tube means having anode-cathode and control electrode-cathode circuits coupled to said resonant-circuit means to constitute therewith a regenerative oscillatory circuit, a second resonant-circuit means included in said anode-cathode circuit and responsive to an applied periodic quench voltage for controlling the conductance of said regenerative oscillatory circuit to have positive and negative values during alternate operating intervals and a conductance-time characteristic effective to provide superregenerative amplification of wave signals applied to said regenerative oscillatory circuit, and means included in said control electrode-cathode circuit for applying a periodic quench voltage to said regenerative oscillatory circuit and for effecting control electrode-cathode current in said vacuum-tube means to provide additional damping for said regenerative oscillatory circuit but only during said interval of positive conductance to increase the magnitude of said positive conductance during said interval.

10. A superregenerative receiver comprising, resonant-circuit means determining the operating frequency of said receiver, vacuum-tube means having anode-cathode and control electrode-cathode circuits coupled to said resonant-circuit means to constitute therewith a regenerative oscillatory circuit, a second resonant-circuit means included in said anode-cathode circuit and responsive to an applied periodic quench voltage for controlling the conductance of said regenerative oscillatory circuit to have positive and negative values during alternate operating intervals and a conductance-time characteristic effective to provide superregenerative amplification of wave signals applied to said regenerative oscillatory circuit, and rectifier means included in said control electrode-cathode circuit for applying a periodic quench voltage to said regenerative oscillatory circuit and for producing control electrode-cathode current in said vacuum-tube means for damping said regenerative oscillatory circuit but only during said interval of positive conductance to increase the magnitude of said positive conductance during said interval.

11. A superregenerative receiver comprising, resonant-circuit means determining the operating frequency of said receiver, vacuum-tube means having anode-cathode and control electrode-cathode circuits coupled to said resonant-circuit means to constitute therewith a regenerative oscillatory circuit, a second resonant-circuit means included in said anode-cathode circuit and responsive to an applied periodic quench voltage for controlling the conductance of said regenerative oscillatory circuit to have positive and negative values during alternate operating intervals and a conductance-time characteristic effective to provide superregenerative amplification of wave signals applied to said regenerative oscillatory circuit, and a half-wave rectifier system coupled to said control electrode-cathode circuit for applying a periodic quench voltage to said regenerative oscillatory circuit and for effecting control electrode-cathode current in said vacuum-tube means to provide additional damping for said regenerative oscillatory circuit but only during said interval of positive conductance to increase the magnitude of said positive conductance during said interval.

12. A superregenerative receiver comprising, resonant-circuit means determining the operating frequency of said receiver, vacuum-tube means having a control electrode-cathode circuit and coupled to said resonant-circuit means to constitute therewith a regenerative oscillatory circuit, means for coupling an external source of periodic quench voltage to said vacuum-tube means for controlling the conductance of said regenerative oscillatory circuit to have positive and negative values during alternate operating intervals and a conductance-time characteristic effective to provide superregenerative amplification of wave signals applied to said regenerative oscillatory circuit, and circuit means controlled by said quench voltage and so arranged in said control electrode-cathode circuit and having parameters so selected as to apply to said control electrode-cathode circuit during only a selected fractional portion of said interval of positive conductance a signal of such value as to produce control electrode-cathode current for damping said regenerative oscillatory circuit but only during said selected fractional portion of said interval of positive conductance to increase the magnitude of said positive conductance during said fractional portion of said interval, said fractional portion being selected to terminate substantially before the end of said interval of positive conductance.

13. A superregenerative receiver comprising, resonant-circuit means determining the operating frequency of said receiver, vacuum-tube means having a control electrode-cathode circuit and coupled to said resonant-circuit means to constitute therewith a regenerative oscillatory circuit, means for coupling an external source of periodic quench voltage to said vacuum-tube means for controlling the conductance of said regenerative oscillatory circuit to have positive and negative values during alternate operating intervals and a conductance-time characteristic effective to provide superregenerative amplification of wave signals applied to said regenerative oscillatory circuit, and circuit means controlled by said quench voltage and so arranged in said control electrode-cathode circuit and having parameters so selected as to apply to said control electrode-cathode circuit during only a selected fractional portion of said interval of positive conductance a signal of such value as to produce control electrode-cathode current in said vacuum-tube means for damping said regenerative oscillatory circuit but only during said interval of positive conductance to increase the magnitude of said positive conductance during said interval.

14. A superregenerative receiver comprising, resonant-circuit means determining the operating frequency of said receiver, vacuum-tube means having a control electrode cathode circuit and coupled to said resonant-circuit means to constitute therewith a regenerative oscillatory circuit, means for controlling the conductance of said regenerative oscillatory circuit to have positive and negative values during alternate operating intervals and a conductance-time characteristic effective to provide superregenerative amplification of wave signals applied to said regenerative oscillatory circuit, means for applying to said control electrode-cathode circuit a potential having such polarity and magnitude as to produce control electrode-cathode current in said vacuum-tube means for providing additional damping for said regenerative oscillatory circuit, and circuit components included in said control electrode-cathode circuit for so controlling said last-named means that said additional damping is provided only during said interval of positive conductance.

15. A superregenerative receiver comprising, resonant-circuit means determining the operating frequency of said receiver, vacuum-tube means having a control electrode-cathode circuit and coupled to said resonant-circuit means to constitute therewith a regenerative oscillatory circuit, means for controlling the conductance of said regenerative oscillatory circuit to have positive and negative values during alternate operating intervals and a conductance-time characteristic effective to provide superregenerative amplification of wave signals applied to said regenerative oscillatory circuit, means for applying to said control electrode-cathode circuit a potential having such polarity and magnitude as to produce control electrode-cathode current in said vacuum-tube means for providing additional damping for said regenerative oscillatory circuit, and a cathode impedance included in said control electrode-cathode circuit for so controlling said last-named means that said additional damping is provided only during said interval of positive conductance.

16. A superregenerative receiver comprising, resonant-circuit means determining the operating frequency of said receiver, vacuum-tube means having anode-cathode and control electrode-cathode circuits and coupled to said resonant-circuit means to constitute therewith a regenerative oscillatory circuit, quenching means for controlling the conductance of said regenerative oscillatory circuit to have positive and negative values during alternate operating intervals and a conductance-time characteristic effective to provide superregenerative amplification of wave signals applied to said regenerative oscillatory circuit, means for applying to said control electrode-cathode circuit a potential having such polarity and magnitude as to produce control electrode-cathode current in said vacuum-tube means for providing additional damping for said regenerative oscillatory circuit, and a second resonant-circuit means tuned substantially to the frequency of said quenching means and common to said anode-cathode and control electrode-cathode circuits for so controlling said last-named means that said additional damping is provided only during said interval of positive conductance and for augmenting said additional damping during said interval.

17. A superregenerative receiver comprising, resonant-circuit means determining the operating frequency of said receiver, vacuum-tube means having anode-cathode and control electrode-cathode circuits coupled to said resonant-circuit means to constitute therewith a regenerative oscillatory circuit, means for coupling an external source of periodic quench voltage to said vacuum-tube means for controlling the conductance of said regenerative oscillatory circuit to have positive and negative values during alternate operating intervals and a conductance-time characteristic effective to provide superregenerative amplification of wave signals applied to said regenerative oscillatory circuit, and a second resonant-circuit means tuned substantially to the frequency of said periodic quench voltage and common to said anode-cathode and control electrode-cathode circuits for producing control electrode-cathode current in said vacuum-tube means for providing additional damping for said regenerative oscillatory circuit but only during said interval of positive conductance.

18. A superregenerative receiver including an arrangement for controlling an operating characteristic thereof comprising, resonant-circuit means determining the operating frequency of said receiver, vacuum-tube means having an anode-cathode circuit and coupled to said resonant-circuit means to constitute therewith a regenerative oscillatory circuit, means for applying a periodic quench voltage to said anode-cathode circuit for controlling the conductance of said regenerative oscillatory circuit to have positive and negative values during alternate operating intervals and a conductance-time characteristic effective to provide superregenerative amplification of wave signals applied to said regenerative oscillatory circuit, additional means for damping said regenerative oscillatory circuit but only during said interval of positive conductance to increase the magnitude of said positive conductance during said interval, means for deriving a control effect varying in accordance with variations of said operating characteristic of said receiver, a variable impedance connected in shunt relation to the anode and cathode electrodes of said vacuum-tube means, and means for utilizing said control effect to adjust the effective value of said variable impedance to determine the magnitude of said quench voltage as applied to said regenerative oscillatory circuit, thereby to control said operating characteristic of said receiver.

19. A superregenerative receiver including an arrangement for controlling an operating characteristic thereof comprising, resonant-circuit means determining the operating frequency of said receiver, vacuum-tube means having anode-cathode and control electrode-cathode circuits coupled to said resonant-circuit means to constitute therewith a regenerative oscillatory circuit, means for applying a periodic quench voltage to said anode-cathode circuit for controlling the conductance of said regenerative oscillatory circuit to have positive and negative values during alternate operating intervals and a conductance-time characteristic effective to provide superregenerative amplification of wave signals applied to said regenerative oscillatory circuit, a second resonant-circuit means tuned substantially to the frequency of said quench voltage and common to said anode-cathode and control electrode-cathode circuits for producing control electrode-cathode current in said vacuum-tube means to provide additional damping for said regenerative oscillatory circuit but only during said interval of positive conductance, means for deriving a control effect varying in accordance with variations of said operating characteristic of said receiver, a second vacuum-tube means having anode and cathode electrodes connected in shunt relation to the anode and cathode electrodes of said first-named vacuum-tube means and having a control electrode maintained substantially at the potential of its cathode electrode for signals of the frequency of said quench voltage, and means for utilizing said control effect to adjust the conductivity of said second vacuum-tube means to determine the magnitude of said quench voltage as applied to said regenerative oscillatory circuit, thereby to control said operating characteristic of said receiver.

20. A superregenerative receiver comprising, resonant-circuit means determining the operating frequency of said receiver, vacuum-tube means having a control electrode-cathode circuit and coupled to said resonant-circuit means to constitute therewith a regenerative oscillatory circuit, means for controlling the conductance of said regenerative oscillatory circuit to have positive and negative values during alternate operating intervals and a conductance-time characteristic effective to provide superregenerative amplification of wave signals applied to said regenerative oscillatory circuit, and additional circuit means coupled to said regenerative oscillatory circuit and having parameters so selected as to apply a potential to said control electrode-cathode circuit to effect sustained current flow therein for damping said regenerative oscillatory circuit but only during a selected major portion of said interval of positive conductance to increase the magnitude of said positive conductance during said portion of said interval, said portion being selected to terminate substantially before the end of said interval of positive conductance.

BERNARD D. LOUGHLIN.

REFERENCES CITED

The following references are of record in the file of this patent:

UNITED STATES PATENTS

| Number | Name | Date |
|---|---|---|
| 2,030,120 | Rost | Feb. 11, 1936 |
| 2,091,546 | Hruska | Aug. 31, 1937 |
| 2,171,148 | Percival | Aug. 29, 1939 |
| 2,412,710 | Bradley | Dec. 17, 1946 |